United States Patent [19]

Scholz

[11] Patent Number: 5,664,913

[45] Date of Patent: Sep. 9, 1997

[54] DRILL BUSHING

[75] Inventor: Craig R. Scholz, West Allis, Wis.

[73] Assignee: Economy Bushing Company, Milwaukee, Wis.

[21] Appl. No.: 504,146

[22] Filed: Jul. 19, 1995

[51] Int. Cl.⁶ .................................................. B23B 49/02
[52] U.S. Cl. .............................. 408/72 B; 408/115 B; 408/241 B
[58] Field of Search ............................ 408/32, 115 B, 408/241 B, 115 R, 72 B

[56] References Cited

U.S. PATENT DOCUMENTS

| | | |
|---|---|---|
| 1,660,190 | 2/1928 | Fisher . |
| 1,748,006 | 2/1930 | Wohlart . |
| 2,457,709 | 12/1948 | Nolde ................................. 77/62 |
| 2,497,679 | 2/1950 | Maples ............................... 77/62 |
| 2,525,383 | 7/1950 | Sneva ......................... 408/241 B |
| 2,543,840 | 3/1951 | Fisher ................................ 77/62 |
| 2,766,083 | 10/1956 | Fisher .............................. 308/237 |
| 2,881,644 | 4/1959 | Conner ............................... 77/62 |
| 2,915,926 | 12/1959 | Woerner ............................. 77/62 |
| 2,997,902 | 8/1961 | Conner ............................... 77/62 |
| 3,119,287 | 1/1964 | Roberts et al. ..................... 77/62 |
| 3,244,034 | 4/1966 | Severdia ............................. 77/62 |
| 3,306,137 | 2/1967 | Mele .................................. 77/62 |
| 3,591,307 | 7/1971 | Barnard ............................ 408/241 |
| 3,606,566 | 9/1971 | Bethke ............................. 408/241 |
| 3,874,808 | 4/1975 | Zaccardelli et al. ................. 408/1 |
| 4,131,385 | 12/1978 | Narang ............................ 408/241 |
| 4,514,120 | 4/1985 | Hougen ........................... 409/137 |
| 4,651,651 | 3/1987 | Vinceller et al. .................. 408/72 |
| 4,669,926 | 6/1987 | Wilcox, Jr. ........................ 408/1 |
| 4,708,540 | 11/1987 | Heimbigner et al. .............. 408/72 |
| 4,733,996 | 3/1988 | Catapano .......................... 408/79 |
| 5,056,965 | 10/1991 | Tsui et al. ......................... 408/72 |
| 5,108,241 | 4/1992 | Coss ................................. 408/72 |

FOREIGN PATENT DOCUMENTS

| | | | |
|---|---|---|---|
| 244870 | 10/1960 | Australia ....................... 408/241 B |
| 508294 | 6/1939 | United Kingdom .............. 408/72 B |

OTHER PUBLICATIONS

Economy Bushing Co. Brochure —1991 and 1995.

*Primary Examiner*—Daniel W. Howell
*Assistant Examiner*—Henry W. H. Tsai
*Attorney, Agent, or Firm*—Andrus, Sceales, Starke & Sawall

[57] ABSTRACT

A drill bushing is provided with a central passage therethrough for guiding a drill bit, reamer or tap in a production operation. The drill bushing includes a generally cylindrical body extending along the longitudinal axis, and first and second ends. An enlarged head is formed integral with the first end of the body and includes a first concave recess in the periphery of the head which forms a shoulder for facilitating the securing of the drill bushing to a jig plate with a locking screw. A second liner recess is also formed on the periphery of the head. The second recess forms a second shoulder which facilitates, in the alternative, the securing of the drill bushing to the jig plate, with either a locking screw or a clamp bar.

10 Claims, 2 Drawing Sheets

5,664,913

DRILL BUSHING

BACKGROUND AND SUMMARY OF THE INVENTION

This invention relates to bushings, and in particular, to a drill bushing for guiding a drill bit reamer or tap in a production operation.

In order to maintain accuracy in a production operation, a replaceable drill bushing is used to guide a drill bit, reamer or tap. The drill bushing may be slip fit into a liner which is press fit into a mounting hole in a jig plate or fixture, or may be slip fit directly into a mounting hole in a jig plate or fixture. A locking screw or a clamp block is used to maintain the bushing in the liner or in the mounting hole. Because of the large number of types of drill bits, reamers and taps utilized in production operations, and the many different environments in which a drill bushing is used, there are a large number of types and sizes of drill bushings. This, in turn, increases the inventory requirements for the end users of the drill bushings, and increases the number of drill bushings a manufacturer must produce for customers. As a result, it is highly desirable to develop a drill bushing which may be used in many environments, so as to reduce the number of different types of bushings.

Therefore, it is a primary object and feature of the present invention to provide a drill bushing which accurately guides a tool in a production operation.

It is a further object and feature of the present invention to provide a drill bushing which may be used in different environments.

It is a still further object and feature of the present invention to provide a drill bushing which may be secured in a liner or a mounting hole in a jig plate in numerous different manners.

A drill bushing is provided for centering the point of a tool in a production operation. The drill bushing includes a generally cylindrical body extending along the longitudinal axis. The cylindrical body has first and second ends, and the central passage for guiding the tool bit.

A head, integral with the first end of the cylindrical body and having an enlarged diameter, is provided. The head includes first and second sides perpendicular to the longitudinal axis. A first concave recess on the periphery of the head extends from the first side of the head toward the second side of the head to form a first shoulder. A second liner recess on the periphery of the head, spaced from the first recess, extends from the first side of the head towards the second side of the head to form a second shoulder. The second shoulder includes a third concave recess on the periphery of the head extending through the second shoulder.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

I. Prior Art

Figure 1:
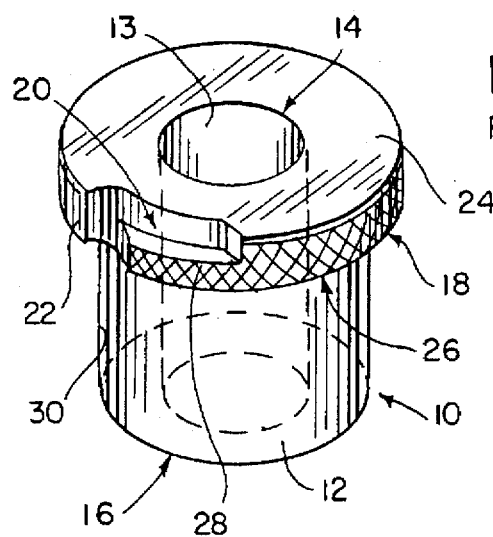
FIG. 1 is an isometric view of a prior art slip renewable drill bushing.

Referring to FIG. 1, a prior art slip renewable drill bushing is generally designated by the reference numeral 10. Drill bushing 10 extends along a longitudinal axis and is generally tubular in shape. Drill bushing 10 includes a cylindrical body 12 and a central passage 13 therethrough for aligning a drill bit tool in a production operation. Cylindrical body 12 of drill bushing 10 is dimensioned for receipt in an opening of a conventional jig plate or the like.

Drill bushing 10 has first and second ends, 14 and 16, respectively, on opposing sides of cylindrical body 12. A head 18 is formed integral with the first end 14 of drill bushing 10, and includes an arcuate recess 20 formed in the periphery 22 of head 18. Arcuate recess 20 extends from a first side 24 of head 18 toward an opposing second side 26 of head 18 so as to form a shoulder 28. Shoulder 28 cooperates with a locking screw threaded into a jig plate to prevent axial movement of drill bushing 10 when received in an opening in the jig plate.

Shoulder 28 also includes concave recess 30 in the periphery 22 of head 18 which extends through the shoulder 28. Concave recess 30 allows the head of a locking screw to pass over shoulder 28 when drill bushing 10 is slip fit in an opening of a jig plate or the like. Drill bushing 10 may then be rotated clockwise about the longitudinal axis so that a portion of the head of the locking screw extends over the shoulder 28 to prevent axial movement of drill bushing 10 in the jig plate.

In order to remove bushing 10 from the jig plate, bushing 10 is rotated counterclockwise about the longitudinal axis such that the head of the locking screw is allowed to pass through concave recess 30 and past shoulder 28 when drill bushing is slid axially from the opening in the jig plate.

Figure 2:
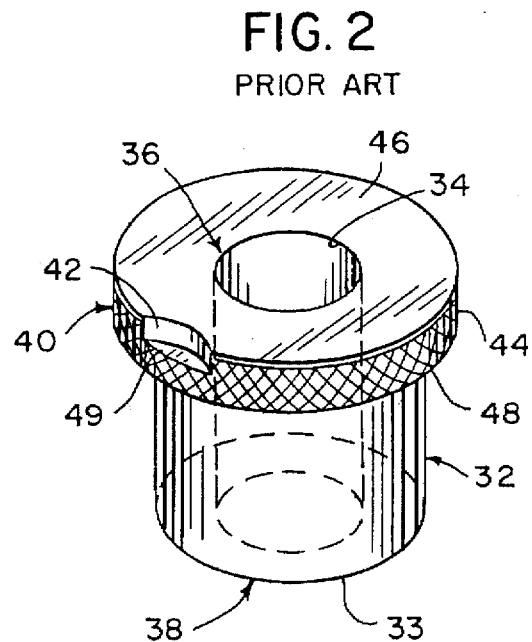
FIG. 2 is an isometric view of a prior art fixed renewable drill bushing.

Referring to FIG. 2, a prior art fixed renewable drill bushing is generally designated by the reference numeral 32. Drill bushing 32 extends along a longitudinal axis and is generally tubular in shape. The drill bushing 32 includes a cylindrical body 33 and a central passage 34 therethrough for aligning a tool in a production operation. Cylindrical body 33 of drill bushing 32 is dimensioned for receipt in an opening of a conventional jig plate or the like.

A drill bushing 32 has first and second ends, 36 and 38, respectively, on opposing sides of cylindrical body 33. Passage 34 extends from the first end 36 to the second end 38 of drill bushing 32. A head 40 is formed integral with the first end 36 of drill bushing 32 and includes a concave recess 42 in the periphery 44 of head 40. Concave recess 42 extends from a first side 46 of head 40 toward an opposing second side 48 of head 40 so as to form a shoulder 49. Shoulder 49 cooperates with a locking screw threaded into a jig plate to prevent rotational and axial movement of drill bushing 32 when received in the opening in the jig plate.

Figure 3:
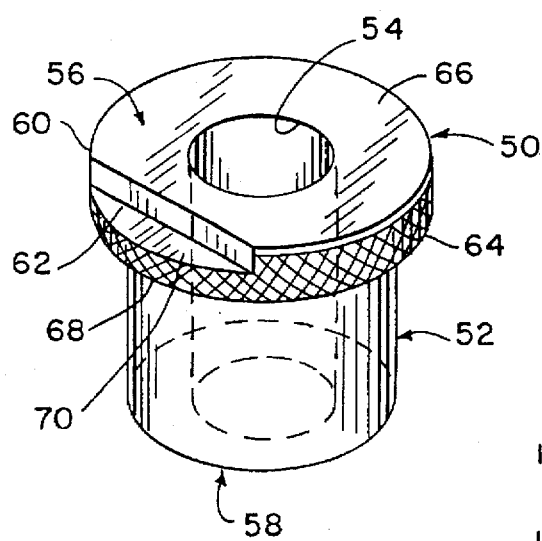
FIG. 3 is an isometric view of a prior art fixed renewal drill bushing.

Referring to FIG. 3, a prior art fixed renewable drill bushing is generally designated by the reference numeral 50. Drill bushing 50 extends along a longitudinal axis and is tubular in shape. Drill bushing 50 includes a cylindrical body 52 and a central passage 54 therethrough for aligning a tool in a production operation. Cylindrical body 52 of drill bushing 50 is dimensioned for receipt in an opening in a conventional jig plate, or the like.

Drill bushing 50 has first and second ends, 56 and 58, respectively, on opposing sides of cylindrical body 52. A head 60 is formed integral with the first end 56 of drill bushing 50 and includes a linear recess 62 in the periphery 64 of head 60 extending from a first side 66 of head 60 toward an opposing second side 68 of head 60 so as to form a shoulder 70. Shoulder 70 cooperates with a clamp lock interconnected to the jig plate with a locking screw in order to prevent rotational and axial movement of drill bushing 50 when received in an opening in the jig plate.

II. The Present Invention

Figure 4:
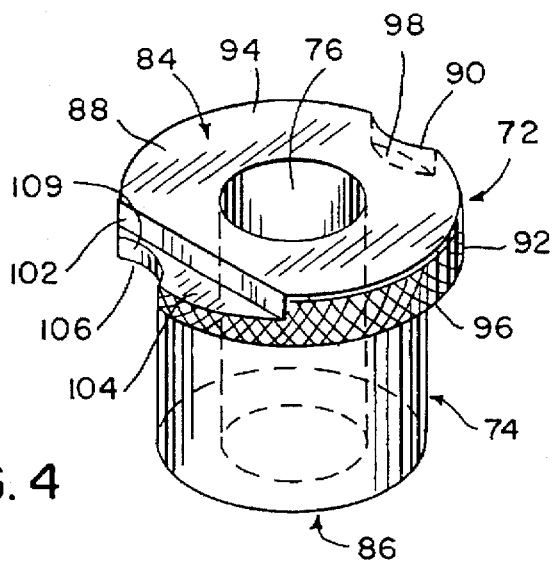
FIG. 4 is an isometric view of the drill bushing of the present invention.

Referring to FIG. 4, a drill bushing, in accordance with the present invention, is generally designated by the reference numeral 72. Drill bushing 72 extends along a longitudinal axis and is tubular in shape. Drill bushing 72 includes a cylindrical body 74 and a central passage 76 therethrough for aligning a tool in a production operation. Cylindrical body 74 of drill bushing 72 is dimensioned for receipt in an opening 80 of a conventional jig plate 82, or the like, FIGS. 5–10.

Figure 9:
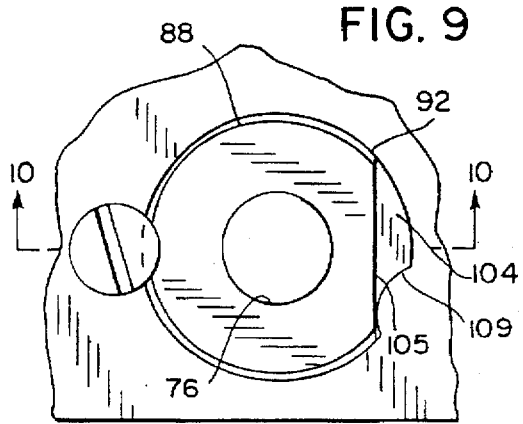
FIG. 9 is a top elevational view of the drill bushing of the present invention.
Figure 10:
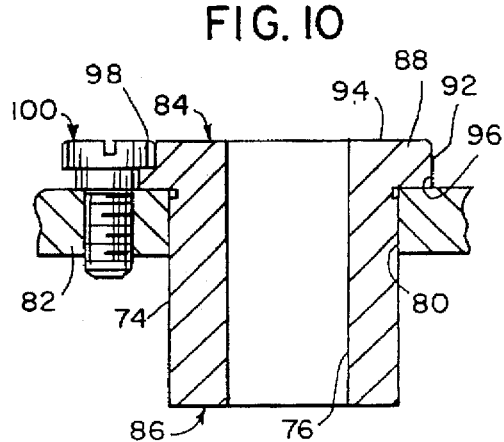
FIG. 10 is a cross sectional view of the drill bushing of FIG. 9 taken along line 10—10.

Drill bushing 72 has first and second ends, 84 and 86, respectively, on opposing sides of cylindrical body 74. A head 88 is formed integral with the first end 84 of drill bushing 72, and includes a first concave recess 90 in the periphery 92 of head 88. Concave recess 90 extends from a first side 94 of head 88 toward an opposing second side 96 of head 88, so as to form a shoulder 98, FIGS. 4 and 10. Concave recess 90 is defined by an arcuate recess sidewall 99 extending between shoulder 98 and first side 94 of head 88. As best seen in FIGS. 9–10, shoulder 98 may cooperate with a locking screw 100 threaded into jig plate 82 to prevent rotational and axial movement of drill bushing 72 when received in opening 80 in jig plate 82.

Figure 5:
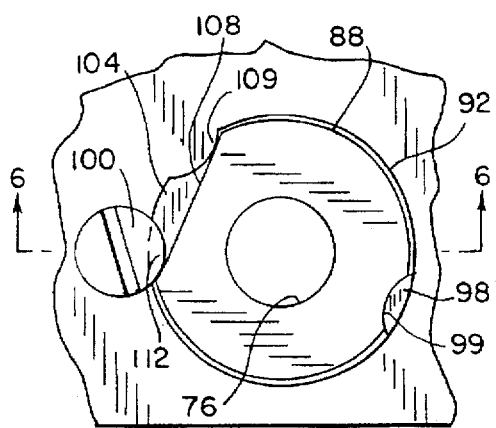
FIG. 5 is a top elevational view of the drill bushing of the present invention.
Figure 6:
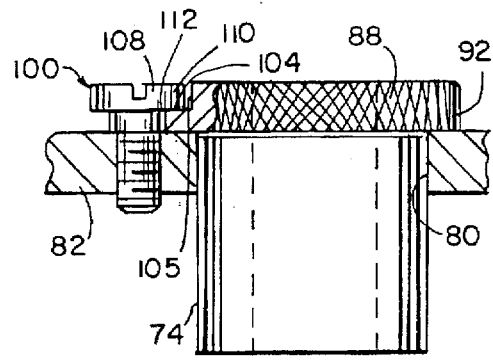
FIG. 6 is a cross sectional view of the drill bushing of FIG. 5 taken along lines 6—6.

Head 88 of drill bushing 72 also includes a second liner recess 102 in the periphery 92 of head 88. Linear recess 102 extends from the first side 94 of head 88 toward an opposing second side 96 of head 88 so as to form a shoulder 104. Linear recess 102 is defined by a linear recess sidewall 105 which is planar and extends perpendicularly from shoulder 104 to first side 94 of head 88. As seen in FIGS. 5–6, shoulder 104 may cooperate with a locking screw 100 threaded into jig plate 82 to prevent rotational and axial movement of drill bushing 72 when received in opening 80 in jig plate 82.

A second concave recess 106 extends through shoulder 104 on the periphery 92 of head 88 and is defined by concave recess sidewall 109. Recess 106 allows the head 108 of locking screw 100 to pass over shoulder 104 when the drill bushing is slip fit into opening 80 in jig plate 82. Drill bushing 72 may then be rotated clockwise about the longitudinal axis such that a portion 110 of the head 108 of locking screw 100 extends over a portion 112 of shoulder 104 to prevent axial movement of drill bushing 72 in jig plate 82.

In order to remove drill bushing 72 from jig plate 82, bushing 72 is rotated counterclockwise about the longitudinal axis such that head 108 of locking screw 100 is allowed to pass through concave recess 106 and past shoulder 104 when drill bushing 72 is slid axially from opening 80 in jig plate 82.

Figure 7:
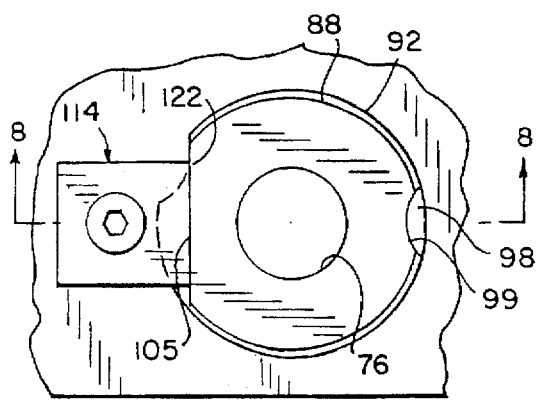
FIG. 7 is a top elevational view of the drill bushing of the present invention.
Figure 8:
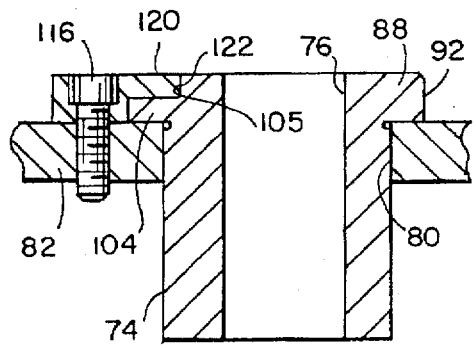
FIG. 8 is a cross sectional view of the drill bushing of FIG. 7 taken along line 8—8.

In the alternative, a clamp bar 114, FIGS. 7–8, may be used to secure drill bushing 72 in opening 80 in jig plate 82. Clamp bar 114 cooperates with a locking screw 116 threaded into jig plate 82 to prevent rotational and axial movement of drill bushing 72 when received in opening 80 in jig plate 82.

As best seen in FIG. 8, clamp bar 114 includes a flange 120 which extends from the clamp bar and terminates at a flat edge 122. When securing drill bushing 72 in opening 80 of jig plate 82, flange 120 is placed over shoulder 104 so as to sandwich shoulder 104 between flange 120 and jig plate 82 when locking screw 116 is threaded into jig plate 82. In addition, flat edge 122 of clamp bar 114 abuts against sidewall 105 which defines linear recess 102 in head 88, in order to prevent rotational movement of drill bushing 72 when received in opening 80 in jig plate 82.

Various modes of carrying out the invention are contemplated as being within the scope of the following claims particularly pointing out and distinctly claiming the subject matter which is regarded as the invention.

I claim:

1. A drill bushing, comprising:
   a generally cylindrical body extending along a longitudinal axis, the cylindrical body having first and second ends, and a central passage therebetween for guiding a tool; and
   an enlarged head about the first end of the cylindrical body, and having first and second sides perpendicular to the longitudinal axis, and further including a first concave recess in the periphery of the head defined by an arcuate concave recess sidewall extending from the first side of the head toward the second side of the head to form a first shoulder, and a second linear recess on the periphery of the head, the second linear recess defined by a generally planar linear recess sidewall extending from the first side of the head toward the second side of the head to form a second shoulder, the second shoulder including a third concave recess extending therethrough, the third concave recess defined by an arcuate concave recess sidewall in the periphery of the head.

2. The drill bushing of claim 1 wherein the periphery of the head is knurled.

3. The drill bushing of claim 1 wherein the enlarged head is integral with the first end of the cylindrical body.

4. A drill bushing assemble for guiding a tool in a production operation, comprising:
   a generally flat jig plate having an opening therethrough;
   a drill bushing having a generally cylindrical body with first and second ends and a central passage therethrough for guiding a tool, the drill bushing further including an enlarged head about the first end of the cylindrical body, the enlarged head having first and second sides and a first concave recess in the periphery of the head defined by an arcuate concave recessed sidewall extending from the first side of the head toward the second side of the head to form a first shoulder, the enlarged head further including a second linear recess on the periphery of the head, the second linear recess defined by a generally planar linear recess sidewall extending from the first side of the head extending towards the second side of the head to form a second shoulder, and the enlarged head further includes a third concave recess extending through the second shoulder, the third concave recess defined by an arcuate concave recess sidewall in the periphery of the head; and means for preventing axial movement of the drill bushing with respect to the jig plate.

5. The drill bushing assembly of claim 4 wherein the means for preventing axial movement of the drill bushing includes a locking screw having an enlarged head such that when the locking screw is threaded into the jig plate, the first shoulder of the drill bushing is received between a portion of the enlarged head of the locking screw and the jig plate.

6. The drill bushing assembly of claim 4 wherein the means for preventing axial movement of the drill bushing includes a locking screw having an enlarged head such that when the locking screw is threaded into the jig plate, the second shoulder of the drill bushing is received between a portion of the enlarged head of the locking screw and the jig plate.

7. The drill bushing assembly of claim 4 wherein the means for preventing axial movement of the drill bushing includes a clamp bar having a flange extending therefrom, the clamp bar secured to the jig plate such that the second shoulder is received between the flange of the clamp bar and the jig plate.

8. The drill bushing assembly of claim 4 wherein the periphery of the head is knurled.

9. The drill bushing assembly of claim 5 wherein the cylindrical body of the drill bushing has a diameter generally equal to the diameter of the opening in the jig plate.

10. The drill bushing assembly of claim 4 wherein the enlarged head of the drill bushing is integral with the first end of the cylindrical body.

* * * * *